July 20, 1943.     S. W. ALDERFER ET AL     2,324,975
PROCESS OF MAKING RUBBER THREAD
Filed Aug. 1, 1938    2 Sheets-Sheet 2
   
      
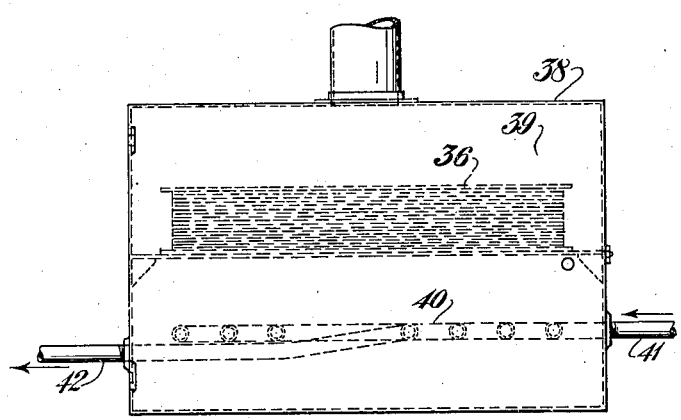
INVENTORS
Sterling W. Alderfer
AND
Harold W. Greenup
BY
Ely & Frye
ATTORNEYS Patented July 20, 1943

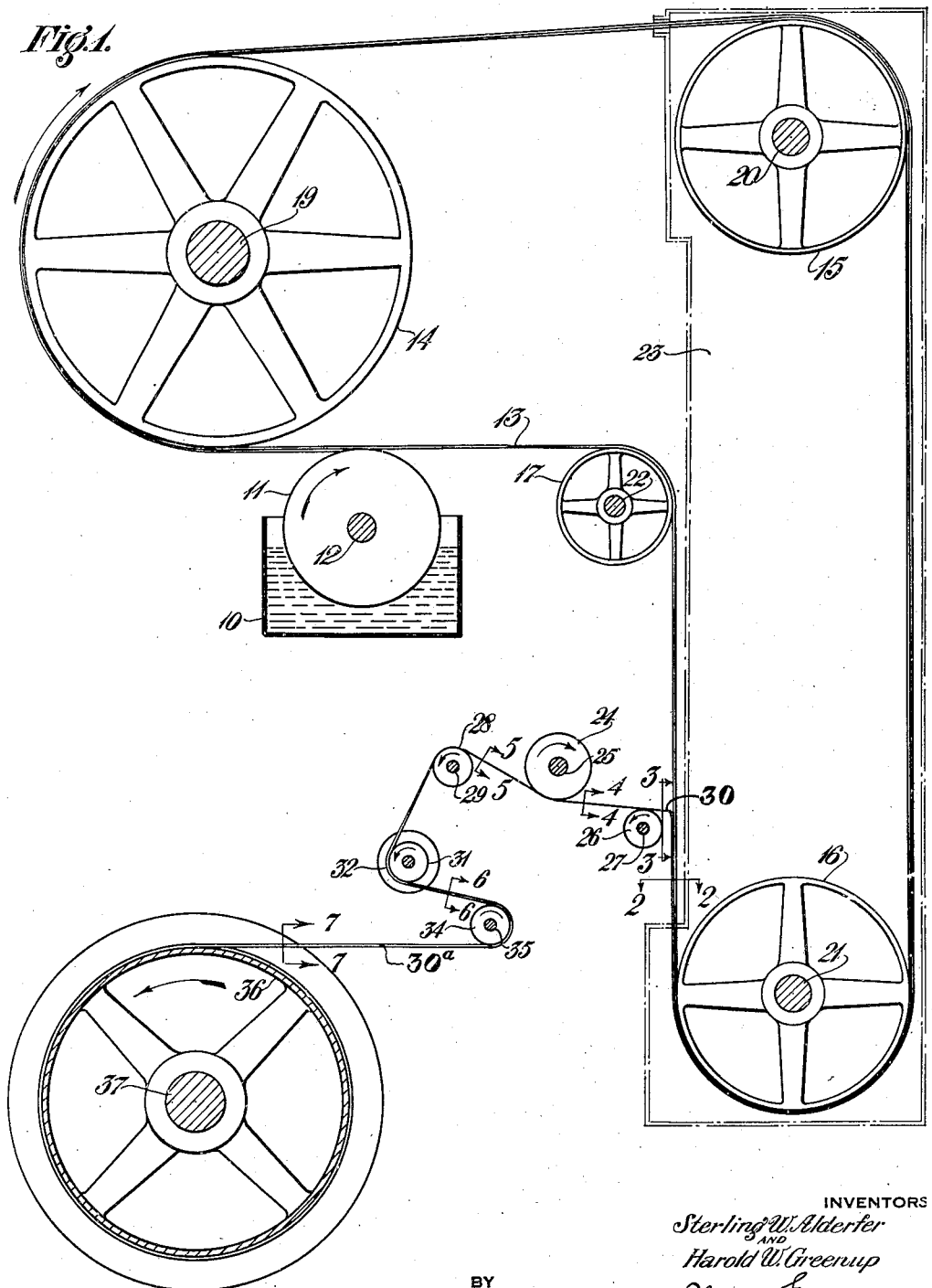

2,324,975

UNITED STATES PATENT OFFICE 2,324,975

PROCESS OF MAKING RUBBER THREAD

Sterling W. Alderfer, Fairlawn, and Harold W. Greenup, Akron, Ohio, assignors to The Firestone Tire & Rubber Company, Akron, Ohio, a corporation of Ohio Application August 1, 1938, Serial No. 222,424

4 Claims. (Cl. 18—54)

This invention relates to the production of continuous rubber articles, particularly to producing thread, tubing, sheeting, or the like directly from liquid latex.

Heretofore latex has been coagulated in strip or thread form, which strips are elongated, dried, and vulcanized to produce the desired product. Also, a partially vulcanized rubber composition has been stretched and then completely vulcanized while stretched to produce a stiff rubber product having unusual properties. Sulfur has also been compounded with rubber, the rubber stretched and then vulcanized. Regardless of the treatment given the rubber, ordinarily the vulcanized final product retracts appreciably when the elongating force is removed, so necessarily the retraction decreases the value of the drawing operation since a portion of the benefits thereof, is lost. Then, too, it is difficult to predetermine the exact size and shape of the finished article.

One main object of this invention is to overcome the foregoing and other disadvantages of known methods of, and apparatus for, producing thread or strip and to provide a method by which a highly elastic, vulcanized rubber thread or strip may be produced.

The above and other objects of this invention are achieved by forming a continuous strip of wet latex upon an endless belt, drying the latex in strip form and then removing the resulting strip of rubber from the belt. This strip is progressively elongated almost to the breaking point thereof, after which a portion of the tensioning force is removed to permit partial retraction, and the rubber strip is wound upon a drum while in its stretched but somewhat retracted, or relieved, condition. Then the strip is annealed to relieve the stresses therein completely and vulcanized to retain it in its given form. Preferably a delayed action accelerator is compounded with the latex to facilitate the complete relaxation of the rubber strip prior to its vulcanization.

When the word "latex" is used in the accompanying specification and claims, it will be understood to mean any natural or artificial aqueous dispersion of rubber, for the invention may be practiced with any such composition.

In the accompanying drawings Figure 1 is an elevation, partly in section, of one form of apparatus for practicing the invention.

Figures 2, 3, 4, and 5, are enlarged cross-sectional elevations taken on lines 2—2, 3—3, 4—4, and 5—5, respectively, of Figure 1.

Figures 6 and 7 are perspective views of the thread at lines 6—6 and 7—7 of Figure 1.

Figure 8 is an elevation of a heating chamber used in the practice of the invention.

Referring specifically to Figure 1 of the drawings, a tank 10 is shown which contains compounded liquid latex of a composition that is completely described hereinafter. A disk 11 is carried by shaft 12, so that the disk dips into the latex in the tank and carries out a film of the mixture on its periphery. An endless belt 13 is positioned immediately adjacent the periphery of the disk 11 to remove the latex therefrom and is supported by pulleys 14, 15, 16, and 17, which are associated with shafts 19, 20, 21, and 22. All of the shafts 12, 19, 20, 21, and 22, are journalled upon suitable means (not shown) and the shafts 12 and 19 are driven by any desired apparatus (not shown) in the direction indicated. The belt 13 and the disc 11 move in opposite directions to facilitate the deposition of latex upon the belt, the amount of movement between the belt and disc controlling the amount of latex deposited. In some instances, it will be desirable to jacket a portion of the belt 13, as by chamber 23, and supply a heating medium in the chamber by suitable means (not shown) to speed up the drying of the latex deposited upon the belt by rotation of disk 11. However, the latex may be dried merely by exposure to the atmosphere with no special means being provided for that purpose, in some cases.

After a continuous thin strip 30 of rubber has been formed on belt 13 by the drying of the latex film, it is pulled therefrom by a pulley 24, that is carried by a driven shaft 25. In order to stretch the rubber strip as it is drawn from the belt, the pulley 24 is driven at a greater surface speed than the speed of belt 13, for example a speed of approximately six times the speed of the belt. A guide roll, or pulley 26 is mounted upon a shaft 27 adjacent the belt 13 to serve as a guide for the rubber strip pulled from the belt. The pulley 26 may, or may not, be driven, as desired, it usually being driven at a speed of approximately twice the speed of the belt. From the pull-off pulley 24 the rubber strip is led to a pulley 28, carried by a shaft 29 which is so driven that the surface speed of pulley 28 is greater than the speed of belt 13, for instance, approximately 6½ times the speed of the belt and thus slightly faster than the speed of the pulley 24. Figures 2, 3, 4, and 5, show the rubber strip 30 in the various stages of its travel, whereby the reduction thereof in cross-sectional area produced by the progressive elongation of the rubber strip is clearly shown. This permits production of relatively thin, substantially flat strips of rubber, or by the use of the apparatus next to be described, a thin cylindrical thread.

The particular embodiment of the invention shown herein is adapted to produce a cylindrical latex rubber thread 30ª. Thus a driven roll 31 having a conical flange 32 thereon, receives the strip of rubber from pulley 28 to roll the strip laterally upon itself. Such apparatus and method are shown and described in the Alderfer Patent No. 2,054,354 issued September 15, 1936, so that it need not be specifically described herein. Suffice it to say that the conical flange of roll 31 laterally rolls one edge of the latex rubber strip 30 over and around the other edge thereof. The cylindrical rubber thread 30ª formed on roll 31 is led over pulley 34 which is carried on shaft 35, and then is wrapped upon a drum 36. The drum 36 is mounted upon a shaft 37 which is driven by any suitable means (not shown).

Figures 2 through 5 show that the rubber strip, or tape 30, is relatively thin in comparison with its width and has a relatively thick center portion. However, the strip gradually decreases in thickness from the center thereof to the lateral margins thereof whereby feather edges are formed on the strip. The foregoing features of the strip 30 all facilitate rolling the strip laterally upon itself to form convolutions of the strip around its longitudinal axis and produce the substantially solid rubber thread 30a having a longitudinally extending seam therein which smoothly blends in with the contour of the thread. The manner in which the strip 30 is rolled naturally produces a thread in which the rolled rubber is free from stress. A further feature of the thread 30ª is that the convolutions thereof adhere to each other due to the inherent tackiness of the freshly prepared latex rubber used in forming the strip 30.

A distinct feature of the invention is that the pulleys 28, 32, and 34, are driven at substantially the same speed, which in the example given is approximately 6½ times the surface speed of belt 13, so as to stretch the rubber nearly to its breaking point. This great degree of elongation of the rubber strip aids in rolling the rubber upon itself. Then the surface speed of drum 36 is adjusted so that it is approximately five times the surface speed of the belt, whereby the cylindrical rubber thread produced is permitted to retract an appreciable amount prior to being wound upon the drum. Thus, a large portion of the stresses set-up by elongating the rubber strip are relieved prior to preparing the rubber for vulcanization. Figures 6 and 7 show the respective cross-sectional areas of the cylindrical thread and they indicate the slight increase in cross-sectional area occurring prior to winding the thread upon the drum.

The invention contemplates completely relieving stresses set-up in either form of the product, the flat strip or the cylindrical thread. This is accomplished by annealing the product prior to its vulcanization. Thus the drum 36 with the tensioned strip or thread wound thereon, is placed in a chamber 38 (Figure 8) which has a door 39 thereon, and the chamber heated. A heating coil 40 having inlet and outlet tubes 41 and 42, respectively, is positioned in the oven 38 to supply heat thereto, the tubes 41 and 42 connecting to a suitable source (not shown) of steam, or other heating fluid, for this purpose. The initial heating of the tensioned thread acts to relieve the stresses therein, while continued heating effects vulcanization of the rubber thread.

The preheating of the rubber without vulcanization is accomplished by compounding a delayed action accelerator in the latex composition employed in tank 10. The delayed action accelerators found acceptable in the practice of this invention comprise the substances: di-pentamethylene thiuram tetrasulfide, tetramethyl thiuram disulfide and tetramethyl thiuram tetrasulfide. These all include appreciable combined sulfur, a portion of which is released upon heating. It has been found that a small amount of these delayed action accelerators suffice. Thus, about five tenths of a gram of accelerator may be used with approximately 150 grams of concentrated latex, and the desired action is secured. Necessarily, any desired compounding ingredients, other than free sulfur, may be present in the latex mixture. Since no free sulfur is compounded with the latex and appreciable heating of the accelerator is necessary to free the sulfur contained therein, a period is provided in which the stresses in the tensioned thread are relieved prior to the commencement of vulcanization.

It will be observed that the step of partially relieving the stresses in the stretched rubber prior to winding it upon the drum facilitates the complete relaxation of the rubber prior to vulcanization. By combining the step of partially relieving the elongation of the rubber cylinder prior to winding it upon the drum and by use of the delayed action accelerator, the vulcanized rubber thread obtained does not retract when unwrapped from the drum. Thus, the exact final size of the rubber thread can be forecast, also the per cent of final elongation of the original thread can be predetermined. The finished thread is normally of uniform size and has very desirable physical properties, being capable of 500% or more elongation.

It should be noted that the specific speeds of the pulleys 24, 26, 28, 32, and 34, will vary depending upon the composition of the latex and upon the properties desired of the final product.

In accordance with the patent statutes, we have illustrated and described the preferred embodiment of our invention. However, it will be appreciated that various modifications of the invention may be made without departing from the scope thereof, as defined in the appended claims.

What is claimed is:

1. That method of making rubber strips from latex comprising the steps of compounding sulfur-free latex with a delayed action accelerator capable of releasing sulfur upon prolonged heating, forming a continuous dried rubber strip from said latex compound, progressively stretching the dried rubber strip almost to the breaking point thereof, removing a portion of the tensioning force on the stretched rubber strip to permit partial retraction thereof, heating the rubber strip while it is tensioned to relieve, completely, the stresses therein, continuing the heating of the rubber strip to free sulfur from the delayed action accelerator, and further continuing the heating of the unstressed rubber strip to vulcanize same.

2. That method of manufacturing strips of a predetermined size from latex, comprising the steps of forming a continuous strip of rubber latex coagulum which contains a delayed action accelerator and no free sulfur, progressively stretching the rubber almost to the breaking point thereof, removing a portion of the tensioning force on the stretched rubber strip to permit partial retraction thereof, heating the rubber strip while it is tensioned to relieve, completely, the stresses therein and to free sulfur from the delayed action accelerator, and vulcanizing the rubber strip.

3. A process of forming a continuous rubber article comprising forming a latex rubber tape, stretching the rubber tape almost to the breaking point thereof, continuously laterally rolling the tensioned rubber tape upon itself to form a continuous article having a longitudinally extending seam, the tensioning of the rubber tape facilitating rolling it upon itself, partially relieving the stress in the rubber article by reducing the elongation of same, and annealing the rubber article in order to remove all of the stresses in same and obtain an elongated relaxed rubber article.

4. A process of forming a continuous rubber article comprising forming a latex rubber tape containing substances which effect appreciable vulcanization of the rubber only after prolonged heating of same, stretching the rubber tape almost to the breaking point thereof, continuously laterally rolling the tensioned rubber tape upon itself to form a continuous article having a longitudinally extending seam, the tensioning of the rubber tape facilitating rolling it upon itself, partially relieving the stresses in the rubber article by reducing the elongation of same, heating the stretched rubber article in order to anneal same and remove all of the stresses therein, and continuing the heating to vulcanize the rubber article, the substances in the rubber effecting no appreciable vulcanization thereof until the rubber article is substantially completely relaxed.

STERLING W. ALDERFER.
HAROLD W. GREENUP.